Figure 1:
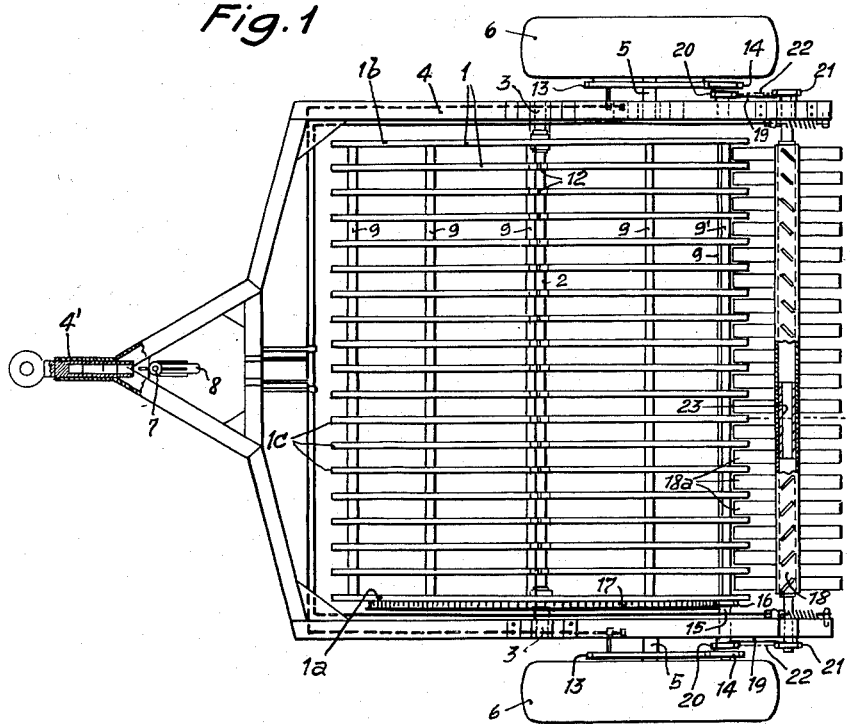

June 13, 1961  W. ERNY  2,988,367
ROTARY AGRICULTURAL MIXER AND SCATTERER
Filed Dec. 15, 1959  2 Sheets-Sheet 1

INVENTOR
WILLY ERNY
BY Lowry & Rinehart
ATTORNEYS

June 13, 1961 W. ERNY 2,988,367
ROTARY AGRICULTURAL MIXER AND SCATTERER
Filed Dec. 15, 1959 2 Sheets-Sheet 2

INVENTOR
WILLY ERNY
BY Lowry & Rinehart
ATTORNEYS 2,988,367
ROTARY AGRICULTURAL MIXER
AND SCATTERER
Willy Erny, Winterthur, Switzerland
Filed Dec. 15, 1959, Ser. No. 859,702
8 Claims. (Cl. 275—3)

The present invention relates to improvements in rotary scattering unloaders which permit to mix fresh manure with old manure or fertilizer as well as to control the scattering density.

The machine according to the present invention substantially differs from known manure-scattering machines by the fact that a hollow body provided with clear openings is destined to receive the material to be scattered, and that knives partly project regulably into the openings to peel the material from the hollow body and scatter same therefrom.

Figure 2:
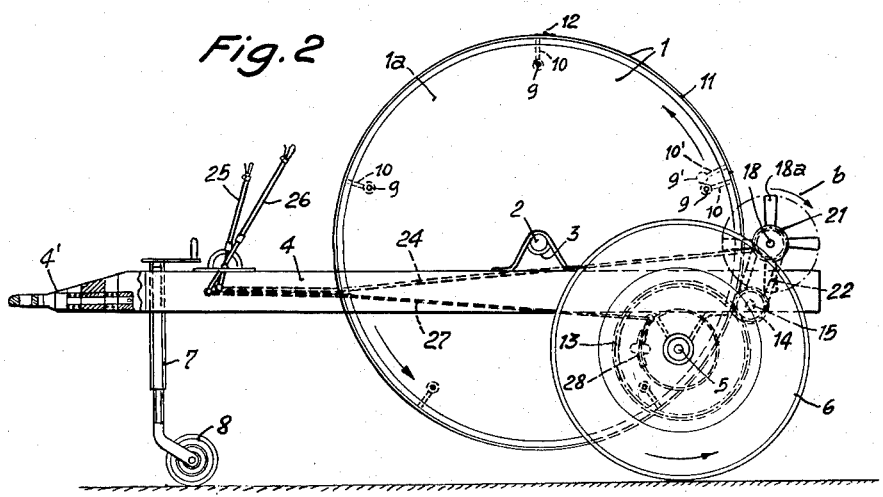
Figure 3:
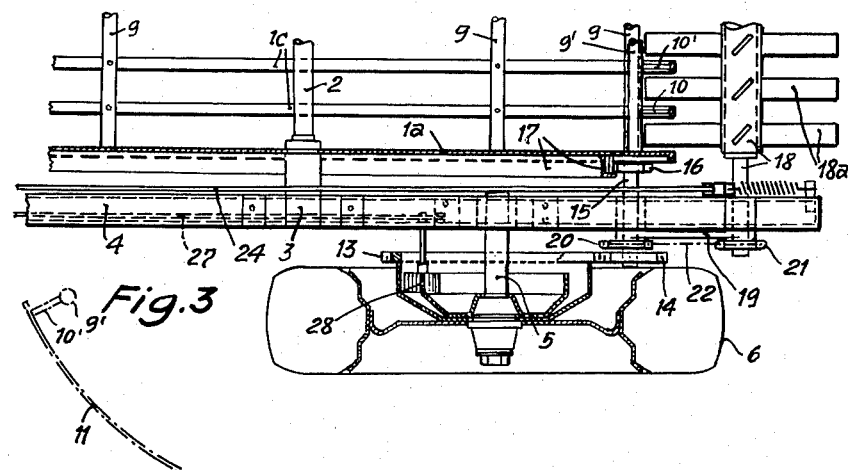
Figure 4:
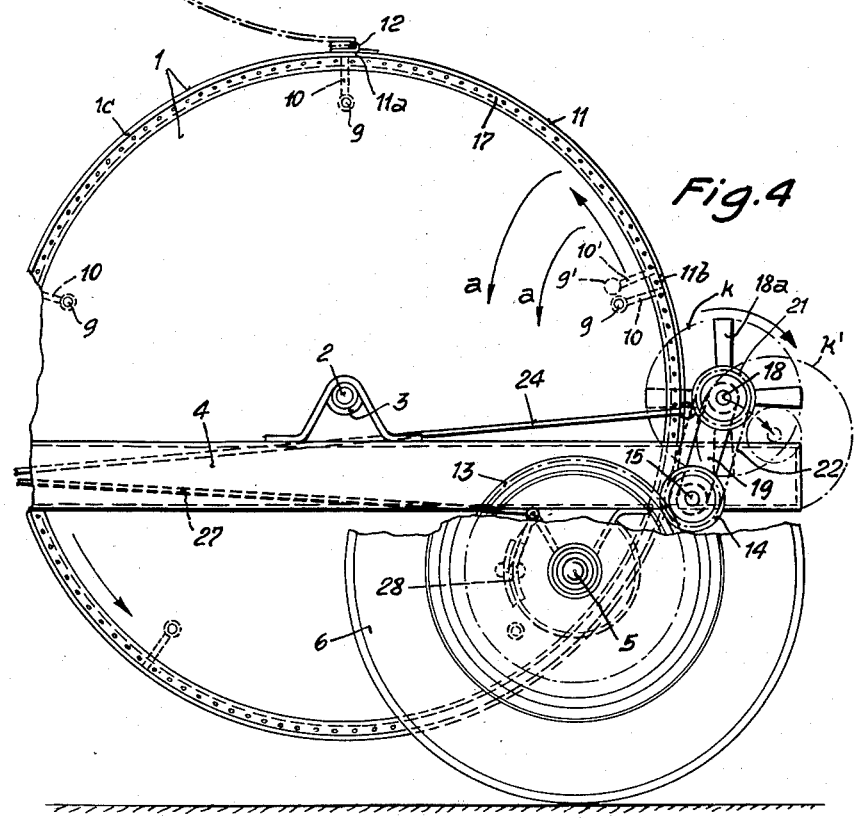

One form of the invention is shown, by way of example, in the drawings, in which:

FIG. 1 is a top plan view of the machine,
FIG. 2 is a side elevation thereof,
FIG. 3 shows a detail of FIG. 1 in a larger scale and partly in horizontal section,
FIG. 4 illustrates a detail of FIG. 2 on a larger scale.

The machine shown includes a drum 1 for receiving the material to be intermixed and scattered, and this drum by means of an axle 2 is journaled in bearings 3 of a chassis frame 4. The vehicle wheels 6 are journaled on two fast axles 5 of chassis frame 4. The vehicle through its front portion 4' may be hitched as a trailer to a tractor or may be supported against the ground by means of a vertically settable brace 7 with roller 8.

Drum 1 comprises two lateral end-walls 1a and 1b which carry the axle 2 and are cross-braced by connecting bars 9, and further a grill-like jacket formed of parallel hoops 1c. The latter are connected to the bars 9 by radial links 10. A portion of the jacket formed by the hoops 1c and situated between two bars 9 is formed as cover 11 for opening the drum. At one joint 11a of the hoops 1c are mounted hinges 12, while at the other joint 11b the hoop-ends of cover portion 11 through radial links 10' are connected to an additional connecting bar 9'.

In FIG. 4, cover 11 is shown by dash-and-dot lines in its open position. In the closed position, cover 11 is closable by locking means known per se and not shown here. Drum 1 is driven by a rim gear 13 disposed on the inside of the vehicle wheels. These gear rims 13 coact with gears 14 which are fixed to drive shafts 15 journaled on both sides in the chassis frame. A gear 16 fixed to one of the drive shafts 15, meshes with a gear rim 17 disposed on one of the drum end-walls. In this way drum 1 is driven in the same direction as the vehicle wheels, as indicated by the arrows shown. The drive speed of the drum is chosen so that the manure cannot be flung out of the drum by centrifugal force.

A knife shaft 18 is journaled on two lateral swing arms 19 approximately at the level of drum-axle 2 in parallel relation therewith and swingable parallel to itself. The swing arms 19 are journaled on the drive shafts 15. The knives 18a of shaft 18 are radially disposed and so spaced from each other and in relation to the hoops 1c, that they may project between the hoops 1c into drum 1 when knife shaft 18 moves towards the drum. The knives 18a partly project there into the drum where the manure does not substantially press outwardly on the drum inside wall. Knife shaft 18 is driven at both ends from the drive shafts 15. Sprocket wheels 20 disposed on the two drive shafts 15 and sprocket wheels 21 disposed on the two ends of knife shaft 18 serve for transmitting the rotary motion and are interconnected on both sides by a sprocket chain 22.

In the range of the knife units, knife shaft 18 is hollow and divided into two parts of substantially equal lengths. The point of separation is bridged by a guide pipe 23 which is secured to one of the hollow-shaft portions. This division of the knife shaft ensures that when driving in a curve the knife-shaft portion situated on the outside of the curve has a greater revolving speed than the knife-shaft portion situated on the curve inside. This kind of speed regulation of the two knife-shaft portions ensures a uniform scattering density in curves.

The knife shaft is driven in such a sense of rotation that the knives projecting into the drum turn in the same sense as the manure in the drum, only at greater speed. By disposing the knife roller on the same level as the drum axis, it is possible to eliminate, in the zone of engagement of the knife roller, the pressure of the manure against the drum surface, as exerted by its own weight. Therefore, the manure is loosened and, while being peeled, accelerated by the knives which turn more swiftly.

The depth of engagement of the knives 18a into the drum is regulable by swinging the knife shaft up or down. To such end, the ends of the arms 19, which carry the knife shaft 18, are connected to a linkage 24 which is correspondingly adjustable by an operating lever 25 disposed in front on the chassis frame. In FIG. 4, the circle $k'$ indicates the position of the disengaged knife shaft. Between these two terminal positions various intermediate positions are possible which are lockable by means of lever 25, so that the machine may be set to any desired scattering density. The connecting bars 9 with the links 10 take along the manure when the drum rotates. These bars are active, in particular, to raise the manure upwardly above the drum axis and let it drop again in the sense of the arrows $a$ (FIG. 4). Thereby is attained a good mixing action and, owing to the relatively great height of fall, a certain consolidation before it moves into the range of knife shaft 18. When the manure drops from the parts 9, 10 it is torn apart and afterwards reconsolidated by its own weight and gravity. In the zone of engagement of knife shaft 18, the manure is loosened again by eliminating its pressure against the drum surface. The knife shaft thus is instrumental in shredding and raising the manure with a comparatively little expenditure of force as well as in scattering it in the direction of the arrow $b$.

Drum brakes 28 are actuable by a brake lever 26 via a linkage 27.

It is important that the knives 18a do not engage the manure in its stationary position, but rather when it is moving upwardly on account of the drum rotation, although at a slower speed, in the turning sense of the knives. It takes less force for turning the knife shaft 18 when the knives 18a engage the manure together while manure and knives move in common, in particular at that point where the manure owing to its position does no longer press outwardly against the drum inside wall. Tearing the manure apart and peeling it out of the drum by means of the knives 18a also is facilitated when the engagement takes place during this characteristic simultaneous movement of knives and manure. As known, the manure first has to be torn apart before it can be well mixed.

It now is readily possible to intermix and scatter old and fresh manure, which is of great value for working the soil. It is evident that fertilizer and the like added to the manure in the drum will be thoroughly admixed thereto.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

What I claim as new and desire to secure by Letters Patent is:

1. In a rotary mixing and scattering unloader the improvement, comprising in combination a hollow body provided with clear openings and destined to receive the material to be scattered, and a plurality of knives regulably biting partly into said openings to peel off and scatter said material from said body, said hollow body being a drum provided with a grill-like jacket and being rotatably mounted with its axle on a vehicle frame, and the latter carrying a shaft studded with said knives and being driven from the vehicle wheels, means being provided in said drum for taking along the manure therein upwardly upon rotation so as to drop same inwardly and outside the range of the knives for the purpose of thoroughly intermixing and consolidating the manure by gravity, said knives being positioned at points where the manure by gravity no longer presses outwardly against the drum inside wall and where the manure and knives undergo movements in the same direction.

2. In a rotary mixing and scattering unloader the improvement, comprising in combination a hollow body provided with clear openings and destined to receive the material to be scattered, and a plurality of knives regulably biting partly into said openings to peel off and scatter said material from said body, said hollow body being a drum provided with a grill-like jacket and being rotatably mounted with its axle on a vehicle frame, and the latter carrying a shaft studded with said knives and being driven from the vehicle wheels, means being provided in said drum for taking along the manure therein upwardly upon rotation so as to drop same inwardly and outside the range of the knives for the purpose of thoroughly intermixing and consolidating the manure by gravity, said knives being positioned at points where the manure by gravity no longer presses outwardly against the drum inside wall and where the manure and knives undergo movements in the same direction, in which the jacket of the drum is formed by a plurality of hoops in parallel relation to each other, said hoops through links extending radially towards the drum axle being connected to bars which interconnect the two drum end walls so that the knives may freely project into the drum up to said bars.

3. In a rotary mixing and scattering unloader the improvement, comprising in combination a hollow body provided with clear openings and destined to receive the material to be scattered, and a plurality of knives regulably biting partly into said openings to peel off and scatter said material from said body, said hollow body being a drum provided with a grill-like jacket and being rotatably mounted with its axle on a vehicle frame, and the latter carrying a shaft studded with said knives and being driven from the vehicle wheels, means being provided in said drum for taking along the manure therein upwardly upon rotation so as to drop same inwardly and outside the range of the knives for the purpose of thoroughly intermixing and consolidating the manure by gravity, said knives being positioned at points where the manure by gravity no longer presses outwardly against the drum inside wall and where the manure and knives undergo movements in the same direction, a drum jacket portion being situated between two of said bars and being formed as a cover for a fill opening.

4. In a rotary mixing and scattering unloader the improvement, comprising in combination a hollow body provided with clear openings and destined to receive the material to be scattered, and a plurality of knives regulably biting partly into said openings to peel off and scatter said material from said body, said hollow body being a drum provided with a grill-like jacket and being rotatably mounted with its axle on a vehicle frame, and the latter carrying a shaft studded with said knives and being driven from the vehicle wheels, means being provided in said drum for taking along the manure therein upwardly upon rotation so as to drop same inwardly and outside the range of the knives for the purpose of thoroughly intermixing and consolidating the manure by gravity, said knives being positioned at points where the manure by gravity no longer presses outwardly against the drum inside wall and where the manure and knives undergo movements in the same direction, said drum being driven by a rim gear disposed on the inside of the vehicle wheels, through a drive shaft meshing via a gear with the rim gear of the wheel and via another gear with a rim gear of the drum.

5. In a rotary mixing and scattering unloader the improvement, comprising in combination a hollow body provided with clear openings and destined to receive the material to be scattered, and a plurality of knives regulably biting partly into said openings to peel off and scatter said material from said body said hollow body being a drum provided with a grill-like jacket and being rotatably mounted with its axle on a vehicle frame, and the latter carrying a shaft studded with said knives and being driven from the vehicle wheels, means being provided in said drum for taking along the manure therein upwardly upon rotation so as to drop same inwardly and outside the range of the knives for the purpose of thoroughly intermixing and consolidating the manure by gravity, said knives being positioned at points where the manure by gravity no longer presses outwardly against the drum inside wall and where the manure and knives undergo movements in the same direction, said knife shaft being situated on the level of the drum axis.

6. In a rotary mixing and scattering unloader the improvement, comprising in combination a hollow body provided with clear openings and destined to receive the material to be scattered, and a plurality of knives regulably biting partly into said openings to peel off and scatter said material from said body, said hollow body being a drum provided with a grill-like jacket and being rotatably mounted with its axle on a vehicle frame, and the latter carrying a shaft studded with said knives and being driven from the vehicle wheels, means being provided in said drum for taking along the manure therein upwardly upon rotation so as to drop same inwardly and outside the range of the knives for the purpose of thoroughly intermixing and consolidating the manure by gravity, said knives being positioned at points where the manure by gravity no longer presses outwardly against the drum inside wall and where the manure and knives undergo movements in the same direction, said knife shaft being journaled on the ends of two swing arms and being adjustable by means of a lever and a linkage for the purpose of regulating the depth of projection of the knives into the drum with respect to their spacing from the drum.

7. In a rotary mixing and scattering unloader the improvement, comprising in combination a hollow body provided with clear openings and destined to receive the material to be scattered, and a plurality of knives regulably biting partly into said openings to peel off and scatter said material from said body, said hollow body being a drum provided with a grill-like jacket and being rotatably mounted with its axle on a vehicle frame, and the latter carrying a shaft studded with said knives and being driven from the vehicle wheels, means being provided in said drum for taking along the manure therein upwardly upon rotation so as to drop same inwardly and outside the range of the knives for the purpose of thoroughly intermixing and consolidating the manure by gravity, said knives being positioned at points where the manure by gravity no longer presses outwardly against the drum inside wall and where the manure and knives undergo movements in the same direction, said jacket of the drum being formed by a plurality of hoops in parallel relation to each other, said hoops through links extending radially towards the drum axle being connected to bars which interconnect the two drum endwalls so that the knives may freely project into the drum up to said bars, said connecting bars carrying said hoops, together with the links forming dogs projecting into the drum for taking along the material to be mixed and scattered.

8. In a rotary mixing and scattering unloader the improvement, comprising in combination a hollow body provided with clear openings and destined to receive the material to be scattered, and a plurality of knives regulably biting partly into said openings to peel off and scatter said material from said body, said hollow body being a drum provided with a grill-like jacket and being rotatably mounted with its axle on a vehicle frame, and the latter carrying a shaft studded with said knives and being driven from the vehicle wheels, means being provided in said drum for taking along the manure therein upwardly upon rotation so as to drop same inwardly and outside the range of the knives for the purpose of thoroughly intermixing and consolidating the manure by gravity, said knives being positioned at points where the manure by gravity no longer presses outwardly against the drum inside wall and where the manure and knives undergo movements in the same direction, said knife shaft being divided into two substantially equal portions which are guided by a connecting piece, one of said two shaft portions being driven by one of the two vehicle wheels and the other by the other wheel.

References Cited in the file of this patent
UNITED STATES PATENTS 920,247     Beem _____ May 4, 1909

FOREIGN PATENTS 40,585 _____ Switzerland _____ Aug. 19, 1907